United States Patent
Chen

(10) Patent No.: US 10,816,020 B2
(45) Date of Patent: Oct. 27, 2020

(54) INTERCHANGEABLE SELF-DEFENSE DEVICE

(71) Applicant: MOTEDO CO., LTD., Taipei (TW)

(72) Inventor: Han-Liang Chen, Taipei (TW)

(73) Assignee: MOTEDO CO., LTD., Taipei (TW)

( * ) Notice: Subject to any disclaimer, the term of this patent is extended or adjusted under 35 U.S.C. 154(b) by 0 days.

(21) Appl. No.: 16/186,930

(22) Filed: Nov. 12, 2018

(65) Prior Publication Data

US 2019/0249698 A1     Aug. 15, 2019

(30) Foreign Application Priority Data

Feb. 14, 2018   (TW) .............................. 107105674 A

(51) Int. Cl.
| | |
|---|---|
| *A47B 96/06* | (2006.01) |
| *F16B 2/22* | (2006.01) |
| *F41H 9/10* | (2006.01) |
| *F21L 4/00* | (2006.01) |
| *F41H 13/00* | (2006.01) |

(52) U.S. Cl.
CPC ................ *F16B 2/22* (2013.01); *F21L 4/005* (2013.01); *F41H 9/10* (2013.01); *F41H 13/0018* (2013.01)

(58) Field of Classification Search
CPC ............ B65D 21/0204; B65D 21/0201; B65D 21/00; B65D 21/02
See application file for complete search history.

(56) References Cited

U.S. PATENT DOCUMENTS

| | | | | |
|---|---|---|---|---|
| 4,223,804 A | * | 9/1980 | Morris ................ | F21V 33/0064 222/3 |
| 4,908,947 A | | 5/1990 | Schaub | |
| 4,992,069 A | * | 2/1991 | Bolli .................... | A63H 33/086 446/128 |
| 5,645,463 A | * | 7/1997 | Olsen .................... | A63H 33/04 446/104 |
| 5,941,629 A | * | 8/1999 | Tuscher ................... | F41H 9/10 362/253 |

(Continued)

FOREIGN PATENT DOCUMENTS

| | | |
|---|---|---|
| CN | 103153417 A | 6/2013 |
| CN | 106457055 A | 2/2017 |

(Continued)

OTHER PUBLICATIONS

English Abstracts for CN103153417, CN106457055, TWM265728, TWM301530, TWM342238, and TWM546251, Total of 6 pages.

*Primary Examiner* — Amy J. Sterling
(74) *Attorney, Agent, or Firm* — R. Lynette Wylie; Apex Juris, pllc.

(57) ABSTRACT

An interchangeable self-defense device has two self-defense devices and two modular housings, the two self-defense devices are respectively mounted in the two modular housings, and each one of the two modular housings has a mounting structure formed on a side surface of the housing. The two mounting structures of the two modular housings can detachably interlock with each other. With the interchangeable self-defense device, the user may conveniently hold the two self-defense devices together as one piece, and also can quickly switch functions from one self-defense device to another; therefore the user may optimize the defensive strategy to cope with different situations.

19 Claims, 16 Drawing Sheets

(56) References Cited

U.S. PATENT DOCUMENTS

| | | | | |
|---|---|---|---|---|
| 6,690,619 | B2 * | 2/2004 | Brausam | H04B 11/00 |
| | | | | 367/134 |
| 6,736,523 | B2 * | 5/2004 | Alvey | F21L 4/005 |
| | | | | 362/158 |
| 8,187,050 | B1 * | 5/2012 | Sorensen | A63H 33/084 |
| | | | | 446/120 |
| 2009/0090647 | A1 * | 4/2009 | Panchal | B65D 81/361 |
| | | | | 206/504 |
| 2010/0237103 | A1 * | 9/2010 | Habermann | F41H 9/10 |
| | | | | 222/183 |
| 2017/0283114 | A1 * | 10/2017 | Marschall | B65D 21/02 |

FOREIGN PATENT DOCUMENTS

| | | |
|---|---|---|
| TW | M265728 | 5/2005 |
| TW | M301530 | 12/2006 |
| TW | M342238 | 10/2008 |
| TW | M546251 | 8/2017 |

* cited by examiner

INTERCHANGEABLE SELF-DEFENSE DEVICE

CROSS-REFERENCE TO RELATED APPLICATIONS

This application is based upon and claims priority under 35 U.S.C. 119 from Taiwan Patent Application No. 107105674 filed on Feb. 14, 2018, which is hereby specifically incorporated herein by this reference thereto.

BACKGROUND OF THE INVENTION

1. Field of the Invention

The present invention relates to a self-defense device consisting of interchangeable self-defense components to integrate functions as a whole, so a user may change and integrate different functions when needed.

2. Description of the Prior Art

Because of the uprising violence and unrest in society, increasingly more people are carrying portable self-defense devices with them. For law enforcement officers, the self defense devices such as firearms have become as indispensable.

Among conventional self-defense devices, for example, pepper spray, flashlights, expandable batons, stun guns or firearms, their specific functions are different from each other, yet have a common purpose to enable the user to protect personal safety when encountering a dangerous or threatening situation. For law enforcement officers and security guards, self-defense devices are frequently used.

To respond appropriately in situations, if the user can flexibly choose the desired device function, the user can consequently optimize the defense strategy per different situation.

However, the conventional self-defense devices are not designed to couple their functions, in other words, to integrate two self-defense functions in one piece, so it is inconvenient for the user to switch different functions among the devices effectively; therefore the conventional self-defense devices are less efficient.

To overcome the disadvantage, the present invention provides an interchangeable self-defense device to improve aforesaid problems.

SUMMARY OF THE INVENTION

The main objective of the present invention is to provide an interchangeable self-defense device that combines two self-defense devices of individual function respectively in two modular housings, and the two modular housings can detachably interlock with each other as one piece but also can be used individually; therefore, the user can choose any two desired self-defense devices of complemental functions from the package and quickly snap two self-defense devices together to be one piece, so when the user holds two devices as one, the user can quickly switch functions to operate between the devices because the two self-defense devices are detachably interlocked with each other.

The interchangeable self-defense device consists of two self-defense devices in two individual modular housings, and each one of the two modular housings has a mounting structure on one side of said modular housing. The two modular housings can be snapped on each other by interlocking the two mounting structures together.

Given the forgoing structure of the interchangeable self-defense device, because the two self-defense devices are respectively mounted in the two modular housings and the two modular housings detachably interlock with each other when in use, the user may conveniently hold the two self-defense devices together as one piece, and also can quickly switch functions between the self-defense devices in one hand.

In other words, by integrating two self-defense devices of different functions as one piece, the interchangeable self-defense device can be deemed one self-defense device with two different functions, and therefore the user may easily change the combination of self-defense functions as desired, so as to cope with different situation more effectively.

Other objectives, advantages and novel features of the invention will become more apparent from the following detailed description when associated with the drawings accompanied.

DETAILED DESCRIPTION OF THE PREFERRED EMBODIMENTS

Figure 1:
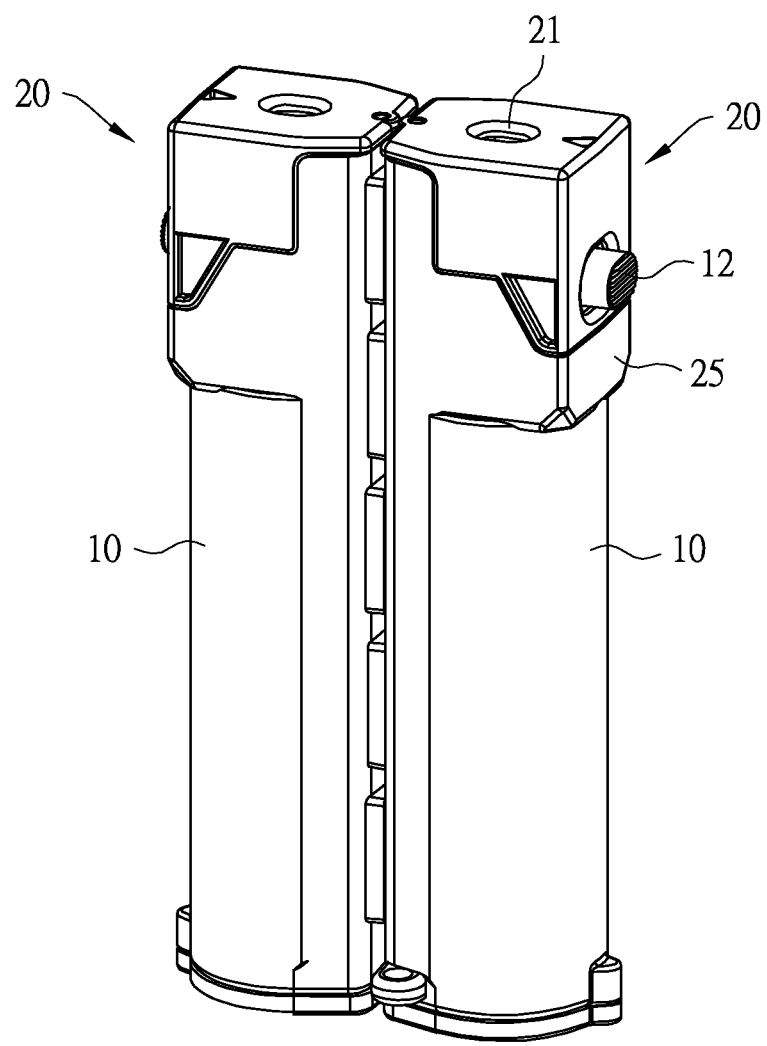
FIG. 1 is a perspective view of an interchangeable self-defense device in accordance with the present invention.

With reference to FIG. 1, a first embodiment of the interchangeable self-defense device in accordance with the present invention comprises two self-defense devices 10 and two modular housings 20. The two self-defense devices 10 are respectively mounted in the two modular housings 20. The term "self-defense device" in the present invention is related to a device including pepper spray, flash light, expandable baton, stun gun, or other device that might be useful in any situation when the user needs to defend against attacks or fight back. In other words, these devices can be used to launch defensive function, so the user may use them to protect personal safety in dangerous situation.

Figure 2:
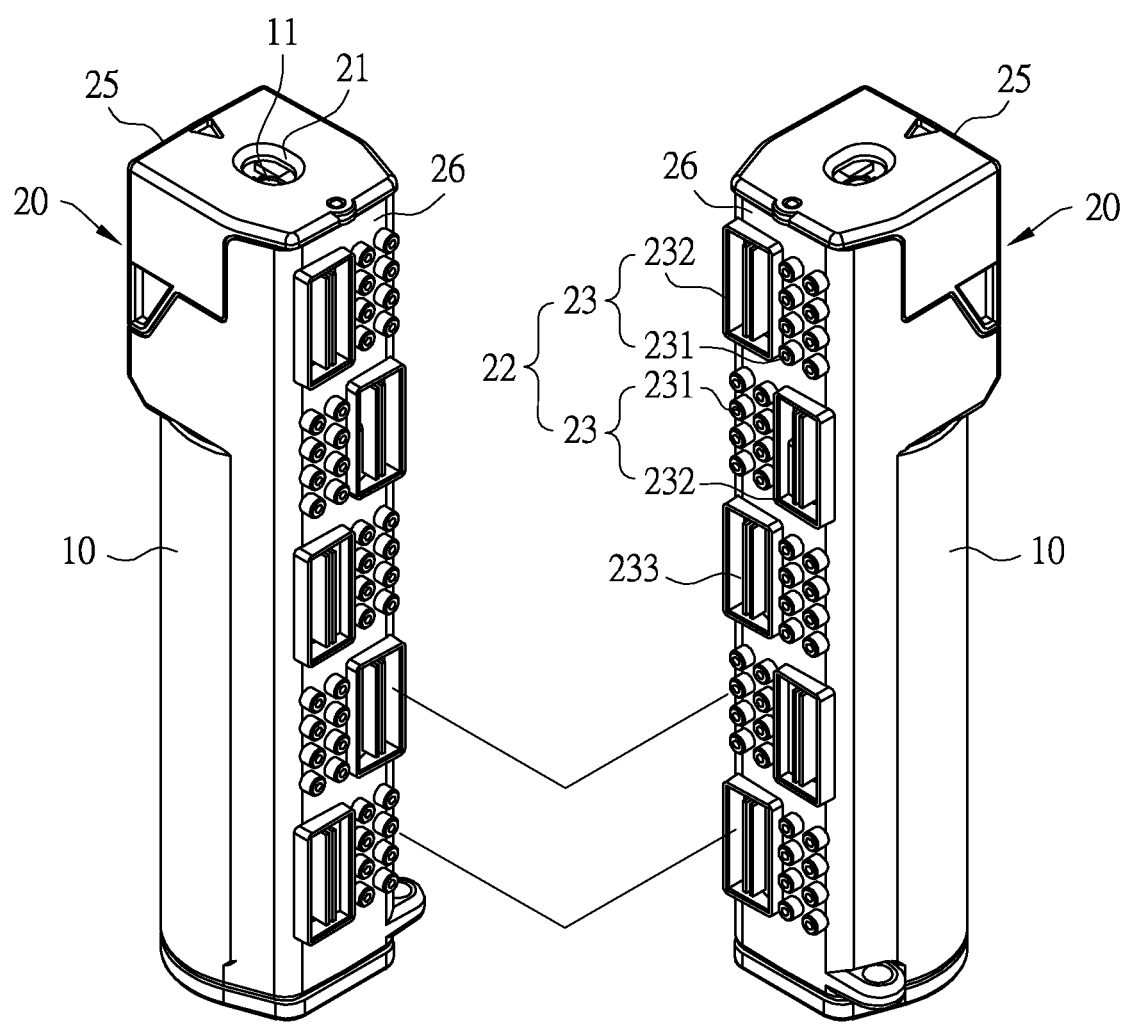
FIG. 2 is an explosion view of the two modular housings in FIG. 1.

With reference to FIGS. 1 and 2, in the first embodiment, a spray can is used as the self-defense device 10. The spray can is filled with, but not limited to, high-pressured gas with irritant substance like pepper mixture. The spray can may also be filled with other types of material which can temporarily neutralize the assailant, so the user has a better opportunity to escape from the dangerous situation.

With reference to FIGS. 1 and 2, in the first embodiment, both of the two self-defense devices 10 are spray cans, but the two spray cans are of different functions, for example, one is with the aerosol spray nozzle and the other is with a stream injection nozzle.

For each self-defense device 10, it further has a nozzle 11 and a push-button 12, the nozzle 11 is mounted on a top of the self-defense device 10, and the push-button 12 is mounted on one side of the self-defense device 10 and the push-button 12 protrudes from the surface of modular housing 20.

With reference to FIGS. 1, 2, 15, and 16, each modular housing 20 further has a perforated hole 21 and a mounting structure 22, but the perforated hole 21 included in the first embodiment is an optional structure because the self-defense device 10 in use is a spray can. In other embodiments, for example, if the self-defense device is a stun gun instead of a spray can, the modular housing 20 will have no such perforated hole 21 on it.

With reference to FIGS. 1, 2, 15, and 16, in the first embodiment, the nozzle 11 of the self-defense device 10 faces toward the perforated hole 21; therefore the perforated hole 21 is formed on a top end of the modular housing 20.

With reference to FIGS. 1 and 2, in the first embodiment, for each self-defense device 10, the push-button 12 protrudes from the surface 25 of the modular housing 20, and for each modular housing 20, the mounting structure 22 is formed on, but not limited to, a rear surface 26 of the modular housing 20. In other embodiments, the mounting structure 22 can also be formed on other side surfaces of the modular housing 20. Specifically, the two modular housings 20 detachably interlock with each other through the mounting structures 22 on the rear surface 22 of each modular housing 20.

Figure 3:
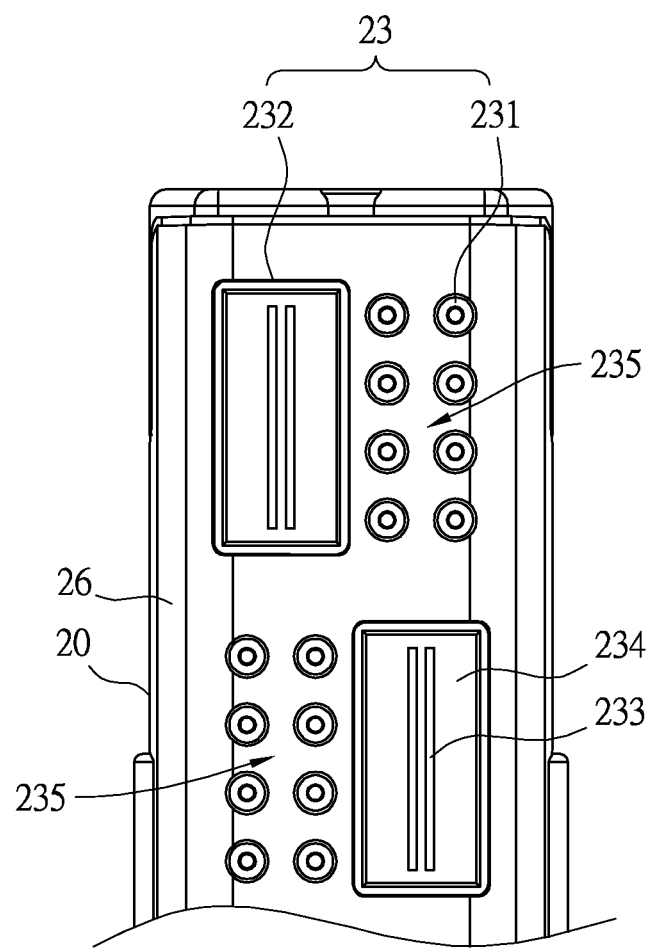
FIG. 3 is a rear view of the mounting unit in the first embodiment in accordance with the present invention.

With reference to FIGS. 2 and 3, each mounting structure 22 comprises at least one mounting unit 23, and in the first embodiment, a number of the at least one mounting unit 23 is plural, and the plural mounting units 23 are arranged apart from each other vertically, but the number and the arrangement of the mounting units 23 are not limited thereto. In another embodiment, each mounting structure 22 can comprise only one mounting unit 23, and in this circumstance, the only one mounting unit 23 is corresponding to the mounting structure 22; furthermore, when each mounting structure 22 has plural mounting units 23, the mounting units 23 can be arranged apart from each other in a way other than vertically arranged, for example, with reference to FIGS. 7 and 8, the mounting units 23 can be arranged apart from each other horizontally.

With reference to FIG. 3, in the first embodiment, each mounting unit 23 comprises at least one inner protrusion 231, an annular mounting wall 232, and a dividing part 233. In the first embodiment, a number of the at least one inner protrusion 231 is plural, but it is not limited thereto, as the number of the inner protrusion 231 can also be only one. The plural inner protrusions 231 are arranged apart from each other and are arranged in a rectangular shape, but it is also not limited thereto, as the inner protrusions 231 can be arranged in a shape other than a rectangular arrangement.

With reference to FIGS. 2 and 3, in the first embodiment, the inner protrusions 231 are arranged apart from the annular mounting wall 232 horizontally.

With reference to FIGS. 2 and 3, the inner protrusions 231 protrude from the rear surface 26 of the modular housing 20, and an engaging space 235 is corresponding to the inner protrusions 231; specifically, the engaging space 235 is formed by the annularly disposed inner protrusions 231.

The annular mounting wall 232 is formed beside the inner protrusions 231, and the dividing part 233 is formed inside the annular mounting wall 232. In the first embodiment, the dividing part 233 consists of two panels, which are parallel to each other, and the two panels divide the inner space that is surrounded by the annular mounting wall 232 into two recesses 234 of the same area.

With reference to FIGS. 2 and 3, when the two modular housings 20 are snapped on each other, the inner protrusions 231 of one of the modular housings 20 detachably interlock with an inner surface of the annular mounting wall 232 of the other modular housing 20.

Specifically, the inner protrusions 231 of one modular housing 20 detachably interlock with the two recesses 234 of the other modular housing 20, and the dividing part 233 of one modular housing 20 detachably interlocks in the engaging space 235 of the other modular housing 20.

That is, for each one of the two modular housings 20, an inner dimension of the recess 234, which is also a minimum distance between the inner surface of the annular mounting wall 232 and the dividing part 233, is slightly smaller than or equal to an outer diameter of the inner protrusion 231 of the other modular housing 20, so when the inner protrusions 231 of one of the two modular housings 20 is snapped into the recess 234 of the other modular housing 20, said inner protrusions 231 can be grabbed in the corresponding recess 234 by the annular mounting wall 232 and the dividing part 233.

But the engaging method between the two modular housings 20 is not limited thereto. Besides that, the dividing part 233 is optional for the present invention, as long as the two modular housings 20 can firmly and detachably engage with each other by interlocking the inner protrusions 231 of one modular housing 20 with the inner surface of the annular mounting wall 232 of the other modular housing 20.

With reference to FIG. 3, in the first embodiment, when viewed from the rear of one of the modular housings 20, the inner protrusions 231 of each mounting unit 23 are arranged as follows: two inner protrusions 231 are arranged apart from each other in a row, and four rows are arranged apart from each other vertically, so the overall eight inner protrusions 231 form a 2×4 rectangle. Also, the annular mounting wall 232 of the same modular housing 20 is in a corresponding rectangular shape and snapped on a left side or a right side of the inner protrusions 231.

And for the mounting units 23 that are arranged apart from each other vertically and on the same modular housing 20, the left-right disposition between the annular mounting wall 232 and the inner protrusions 231 in each mounting unit 23 is different from the mounting units 23 beside said mounting unit 23.

Specifically, if a mounting unit 23 has the annular mounting wall 232 snapped on the right side of the inner protrusions 231 of the same mounting unit 23, then a mounting unit 23 that is snapped on right above or right below said mounting unit 23 has the annular mounting wall 232 snapped on the left side of the inner protrusions 231 of the same mounting unit 23. But the left-right disposition between the annular mounting wall 232 and the inner protrusions 231 in each mounting unit 23 is not limited thereto, and the user can rearrange the disposition properly. Besides that, the arrangement of the inner protrusions 231 in each mounting unit 23 is not limited to rectangular arrangement, and it can also be in any other shape, such as the shape of the annular mounting wall 232.

With reference to FIG. 3, in the first embodiment, the panels of each dividing part 233 are vertically extended panels, and the panels divide the inner space surrounded by the annular mounting wall 232 into two horizontally disposed recesses 234, but it is also not limited thereto, and the panels of each dividing part 233 can also be horizontally extended. In this case, the inner space surrounded by the annular mounting wall 232 is divided into two vertically disposed recesses 234.

Figure 4:
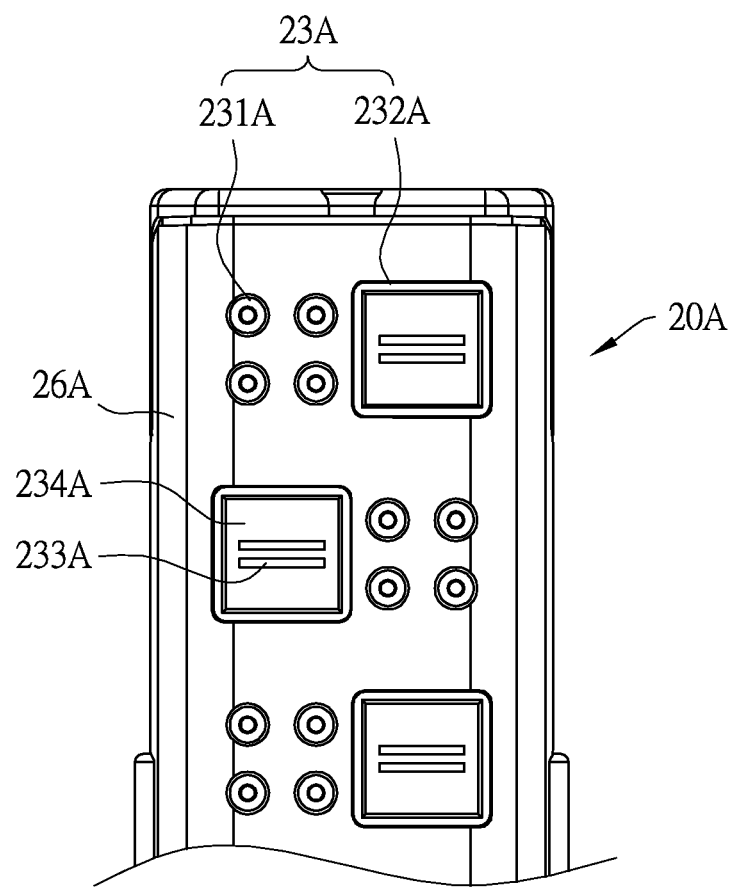
FIG. 4 is a rear view of the mounting unit in the second embodiment in accordance with the present invention.

With reference to FIGS. 3 and 4, the second embodiment of the present invention and the first embodiment are roughly the same, but in the second embodiment of the present invention, when viewed from the rear of one of the modular housings, the inner protrusions 231A of each mounting unit 23A are arranged as follows: two inner protrusions 231A are arranged apart from each other in a row, and two rows are arranged apart from each other vertically, so the overall eight inner protrusions 231A form a 2×2 rectangle. Also, the annular mounting wall 232A of the same modular housing is in a corresponding rectangular shape and disposed on a left side or a right side of the inner protrusions 231A.

Besides, in the second embodiment, each dividing part 233A is a pair of horizontally extended panels, and the dividing part 233A divides the annular mounting wall 232A into two vertically disposed recesses 234A, but it is also not limited thereto.

Figure 5:
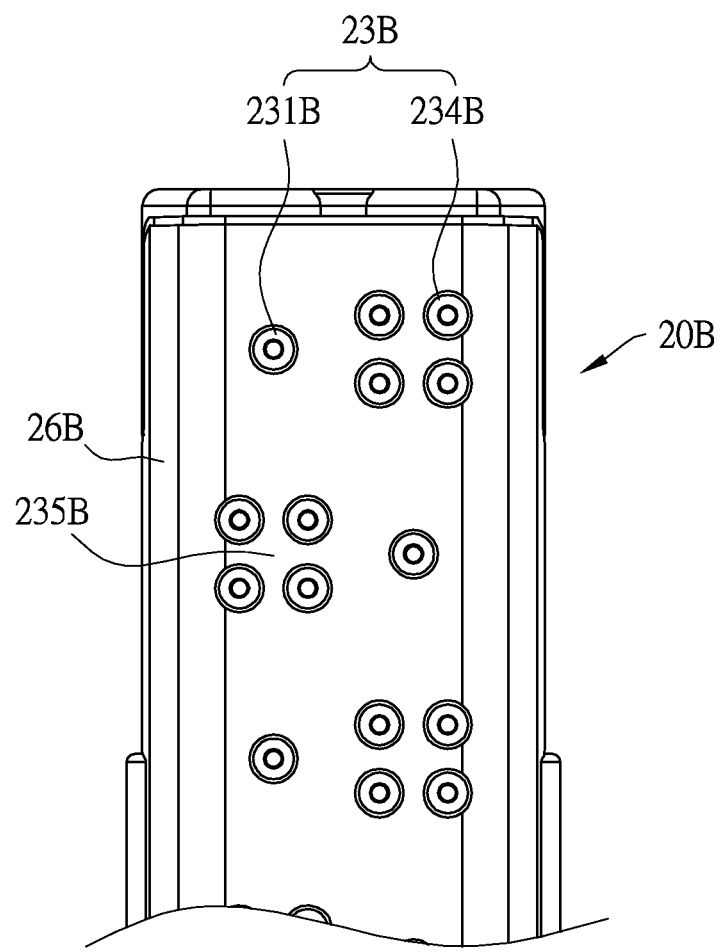
FIG. 5 is a rear view of the mounting unit in the third embodiment in accordance with the present invention.

With reference to FIGS. 3 and 5, the third embodiment of the present invention and the first embodiment are roughly the same, but in the third embodiment of the present invention, when viewed from the rear of one of the modular housings 20B, each mounting unit 23B comprises an inner protrusion 231B and multiple outer protrusions 234B. Furthermore, there is no annular mounting wall in the third embodiment.

Specifically, in the third embodiment, for each mounting unit 23B, the outer protrusions 234B are disposed beside the inner protrusion 231B, and the outer protrusions 234B are arranged in a rectangular shape with an engaging space 235B formed in a middle of the outer protrusions 234B. Therefore, when the two modular housings 20B are snapped on each other, the inner protrusion 231B of each mounting unit 23B of one of the two modular housings 20B is snapped into the engaging space 235B of the corresponding mounting unit 23B of the other modular housing 20B. Specifically, each inner protrusion 231B of one of the two modular housings 20B engages inside the corresponding outer protrusions 234B of the other modular housing 20B.

In other words, in the third embodiment, the engaging space 235B formed by the outer protrusions 234B of each mounting unit 23B has the same function as the engaging spaces in the first and the second embodiments that are formed by the annular mounting walls 232.

Figure 6:
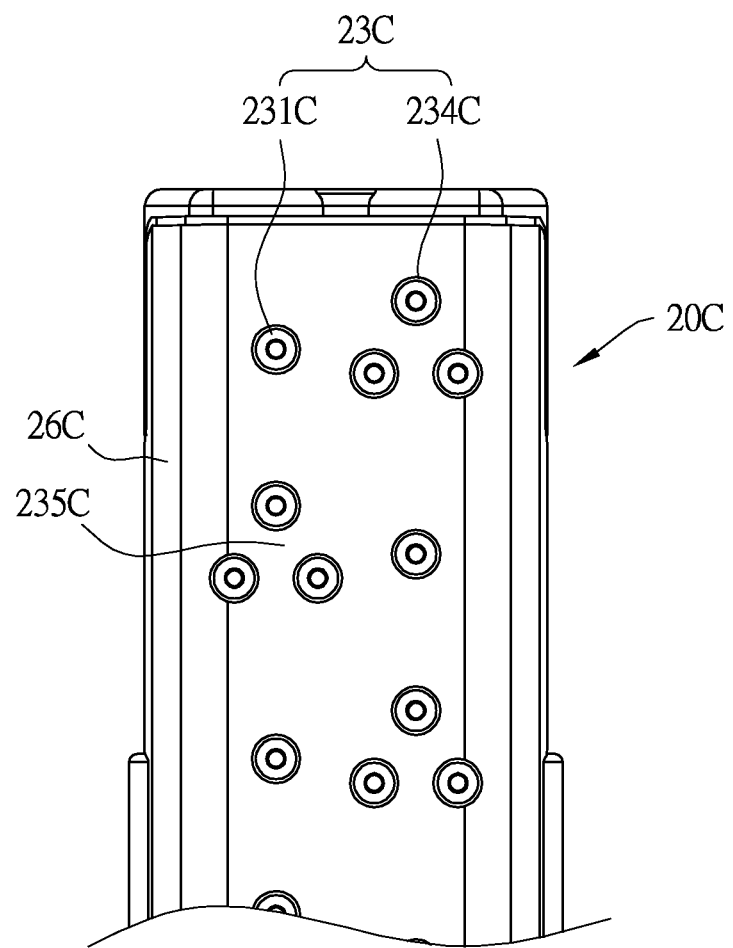
FIG. 6 is a rear view of the mounting unit in the fourth embodiment in accordance with the present invention.

With reference to FIGS. 5 and 6, the fourth embodiment of the present invention and the third embodiment are roughly the same, but in the fourth embodiment, for each mounting unit 23C, the outer protrusions 234C are arranged in a triangular shape with an engaging space 235C formed in a middle of the outer protrusions 234C. Therefore, when two modular housings 20C are snapped on each other, an inner protrusion 231C of one of the two modular housings 20C detachably interlocks in the engaging space 235C of the corresponding mounting unit 23C.

In the third and the fourth embodiments, the arrangement of the outer protrusions 234B, 234C are not limited to a rectangular shape and a triangular shape, and it can also be in any other shape that is "annular". To be precise, the term "annular" in the present invention means "surrounded", and can refer to a circle or a triangle or a rectangle.

Figure 7:
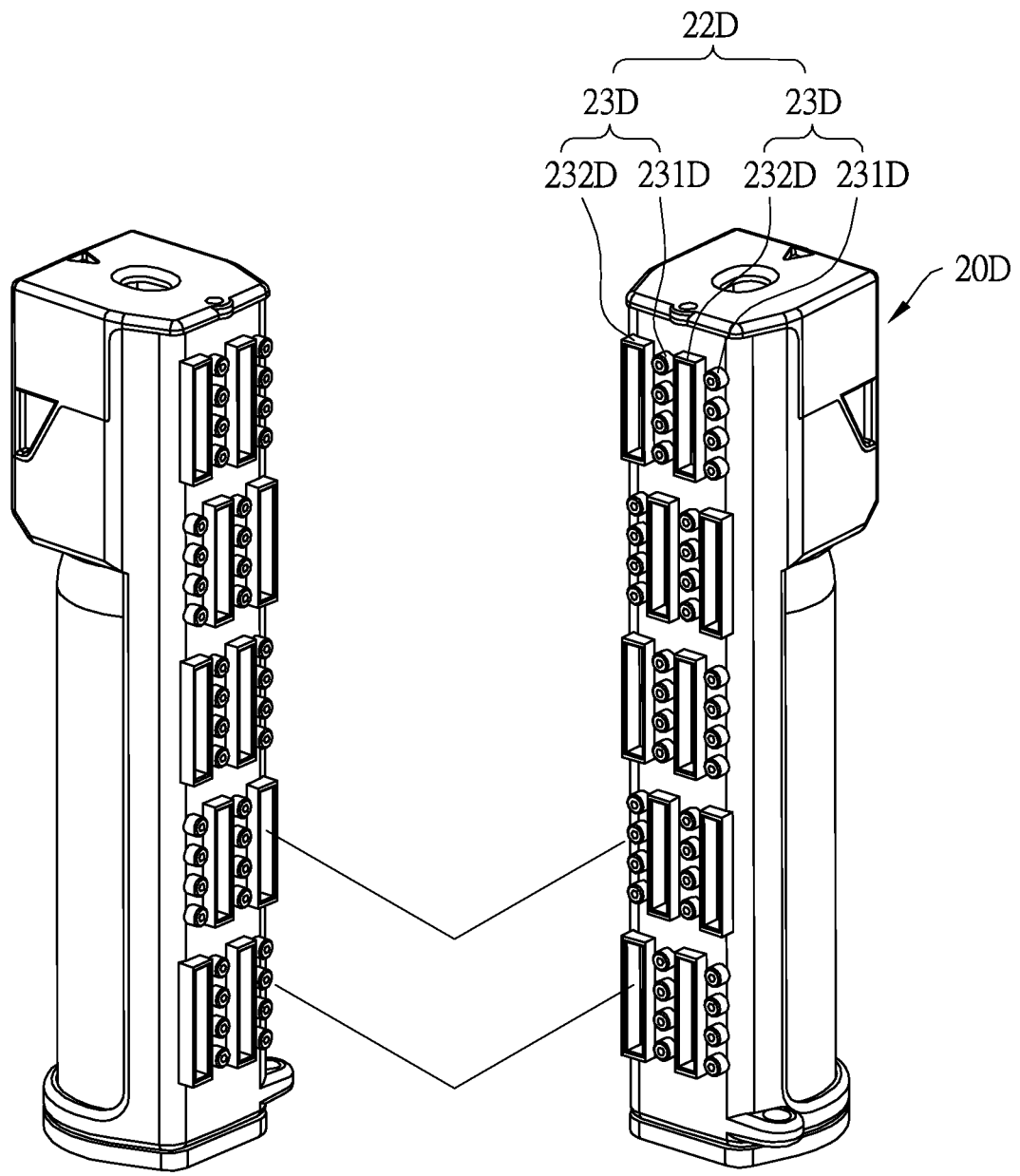
FIG. 7 is a perspective view of the interchangeable self-defense device in the fifth embodiment in accordance with the present invention.

With reference to FIG. 7, FIG. 7 is the fifth embodiment of the present invention. The fifth embodiment is a variation of the first embodiment on the number and the disposition of the mounting structures and the mounting units.

With reference to FIG. 7, in the fifth embodiment, each mounting structure 22D comprises multiple mounting units 23D. For each one of the mounting structures 22D, by shortening a width of each mounting unit 23D (specifically, a width of the arranging manner of the inner protrusions 231D and a width of each annular mounting wall 232D), a surface area of the rear surface of each modular housing can have mounting units 23D disposed horizontally in a row, and multiple rows are arranged apart from each other vertically.

Figure 8:
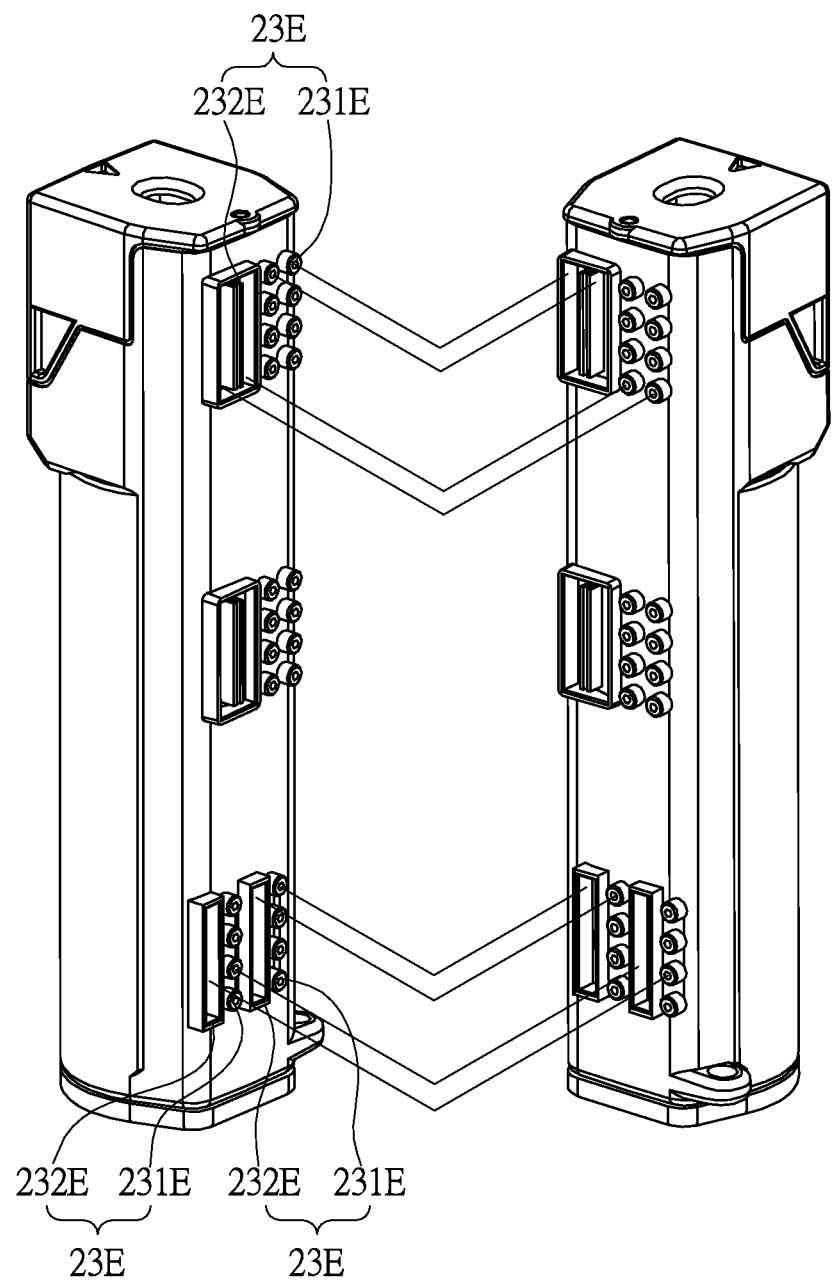
FIG. 8 is a perspective view of the interchangeable self-defense device in the sixth embodiment in accordance with the present invention.

With reference to FIG. 8, FIG. 8 is the sixth embodiment of the present invention. The sixth embodiment is a variation of the first embodiment on the number and the disposition of the mounting structures and the mounting units.

With reference to FIG. 8, specifically, the sixth embodiment simultaneously comprises the arranging structure displayed in the first embodiment (single mounting unit per mounting structure) and the fifth embodiment (multiple mounting units per mounting structure). In other words, when a mounting structure comprises multiple mounting units 23E, the arrangement of each mounting units 23E can be different from each other.

Figure 9:
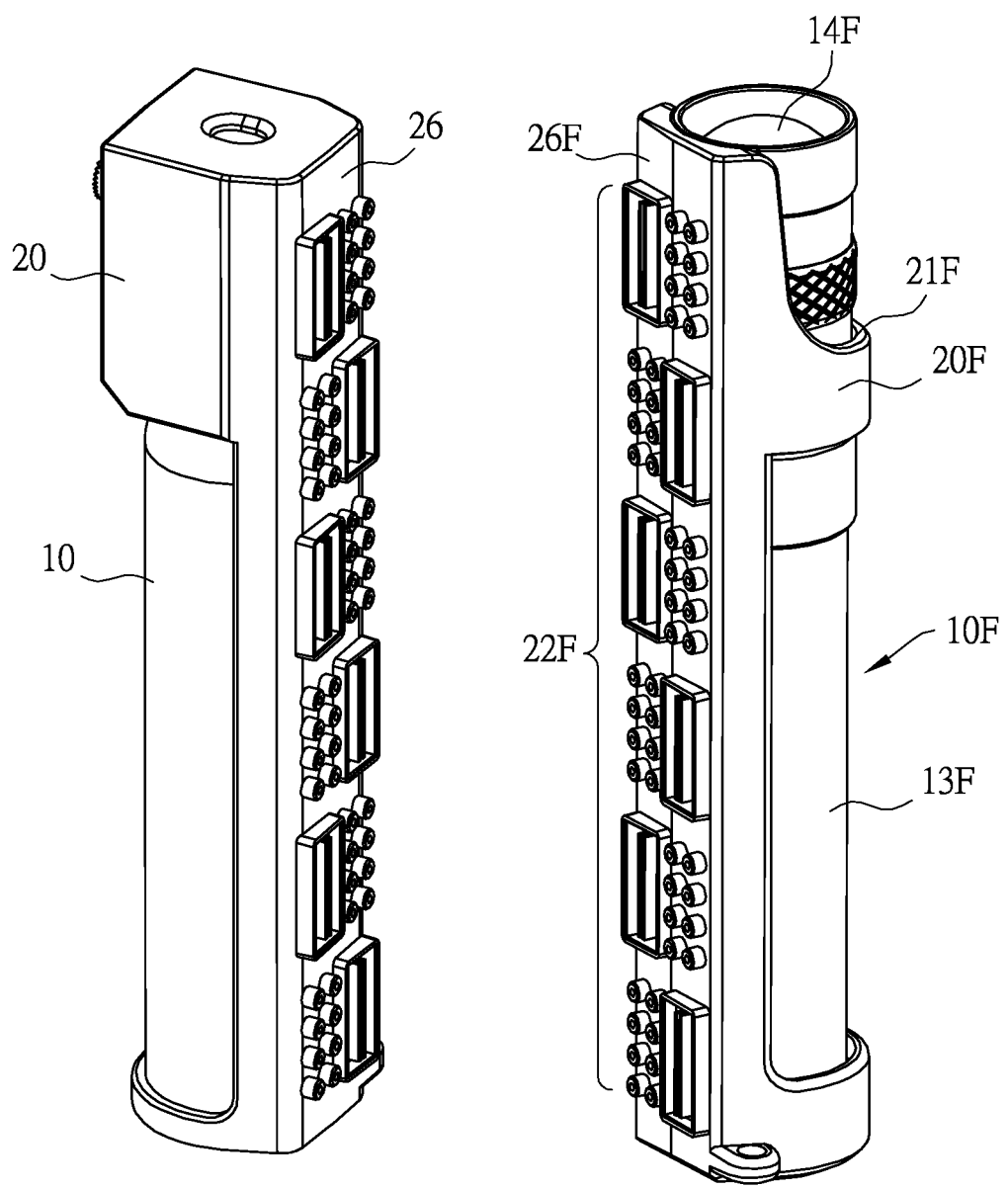
FIG. 9 is a perspective view of the interchangeable self-defense device in the seventh embodiment in accordance with the present invention.
Figure 10:
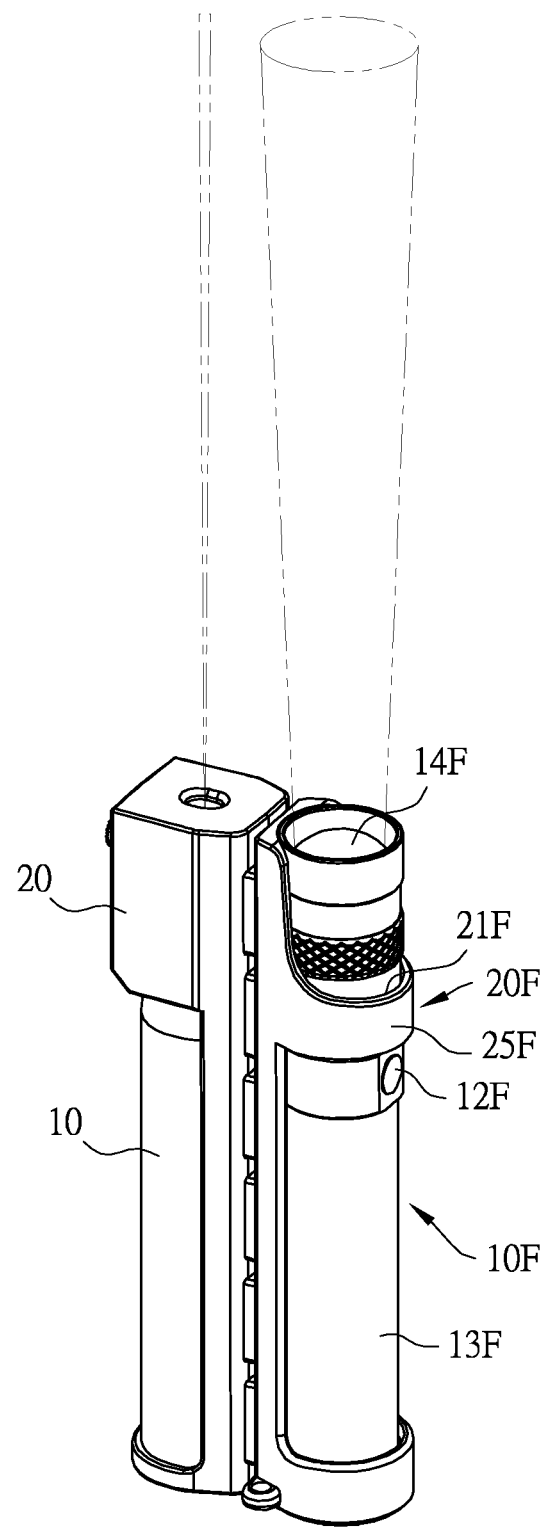
FIG. 10 is an operational view of the interchangeable self-defense device in FIG. 9.

With reference to FIGS. 9 and 10, the seventh embodiment of the present invention and the first embodiment are roughly the same, but in the seventh embodiment, the two self-defense devices 10F, 10 are respectively a flashlight and a spray can. Specifically, the self-defense device 10F that is the flashlight is snapped on the front surface 25F of the corresponding modular housing 20F, and the rear surface 26F of said modular housing 20F is disposed with the mounting structure 22E A bottom of the flashlight is mounted through the perforated hole 21F of the modular housing 20F and abuts a bottom surface of the modular housing 20F.

Specifically, the flashlight comprises a push-button 12F, a holding part 13F, and a light-emitting part 14E By pressing the push-button 12F, the user may trigger the light-emitting part 14F to turn on the lighting function. In the seventh embodiment, the two housings 20F are equipped with different kinds of self-defense devices (the flashlight and the spray can); therefore the user can simultaneously operate these two functions at the same time for better performance.

Figure 11:
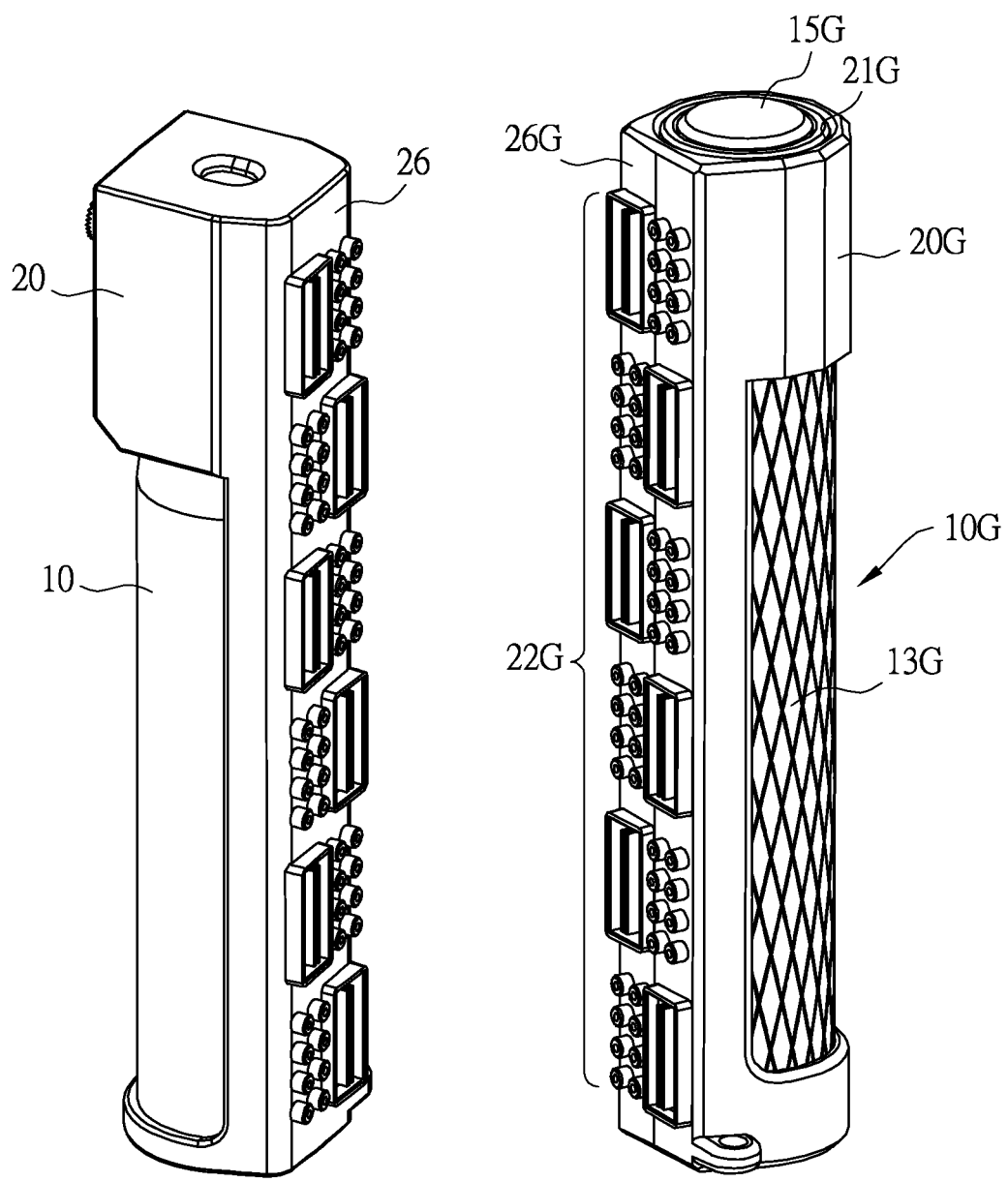
FIG. 11 is a perspective view of the interchangeable self-defense device in the eighth embodiment in accordance with the present invention.
Figure 12:
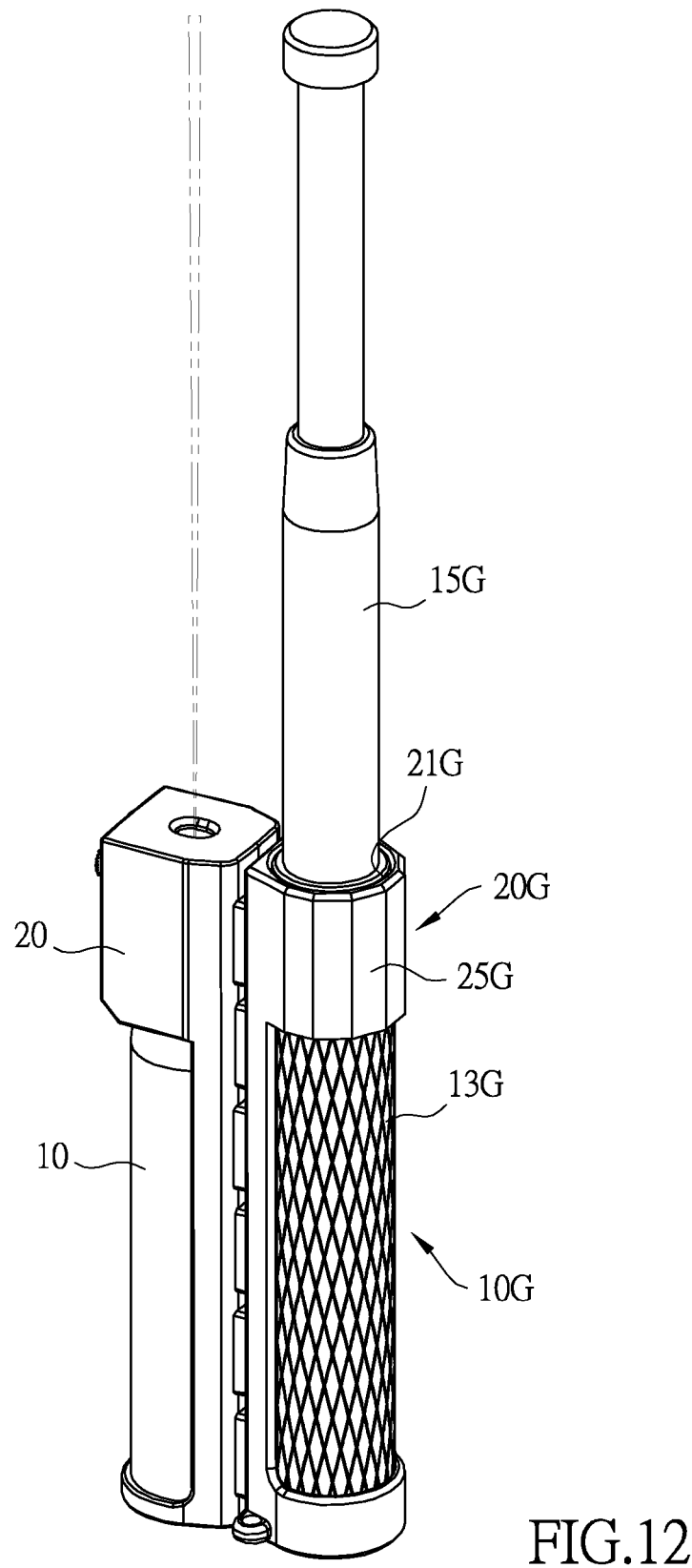
FIG. 12 is an operational view of the interchangeable self-defense device in FIG. 11.

With reference to FIGS. 11 and 12, the eighth embodiment of the present invention and the first embodiment are roughly the same, but in the eighth embodiment, the two self-defense devices 10G, 10 are respectively an expandable baton and a spray can. Specifically, the self-defense device 10G is the expandable baton snapped on the front surface 25G of the corresponding modular housing 20G, and the rear surface 26G of said modular housing 20G is disposed with the mounting structure 22G. A bottom of the expandable baton is mounted through the perforated hole 21G of the housing 20G and abuts a bottom surface of the modular housing 20G.

Specifically, the expandable baton has a holding part 13G and an expandable part 15G. The user can extend or retract the expandable part 15G by lashing the expandable part 15G. The eighth embodiment combines the two different self-defense devices (expandable baton and spray can); therefore the user can simultaneously operate these two functions at the same time for better performance.

Figure 13:
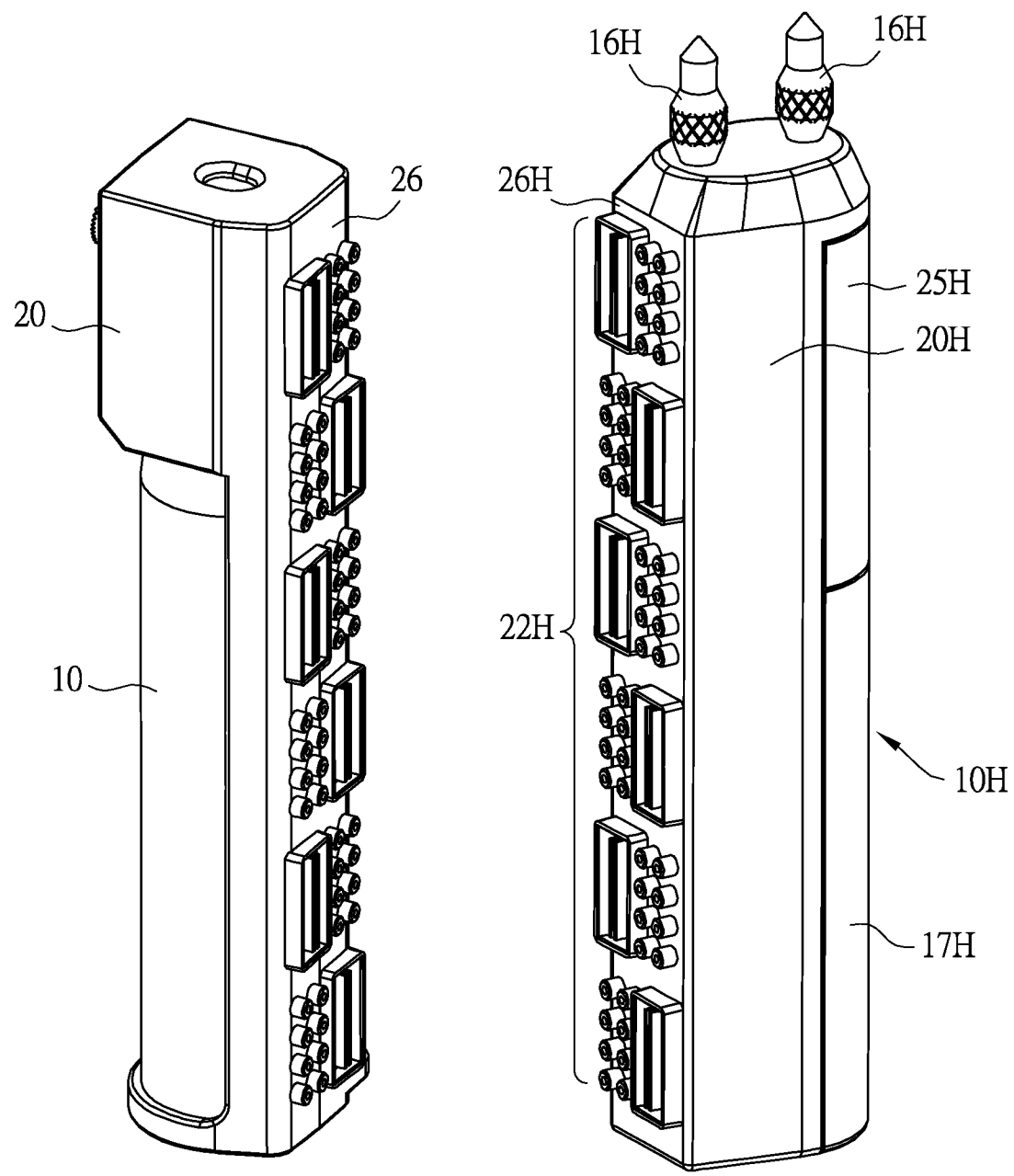
FIG. 13 is a perspective view of the interchangeable self-defense device in the ninth embodiment in accordance with the present invention.
Figure 14:
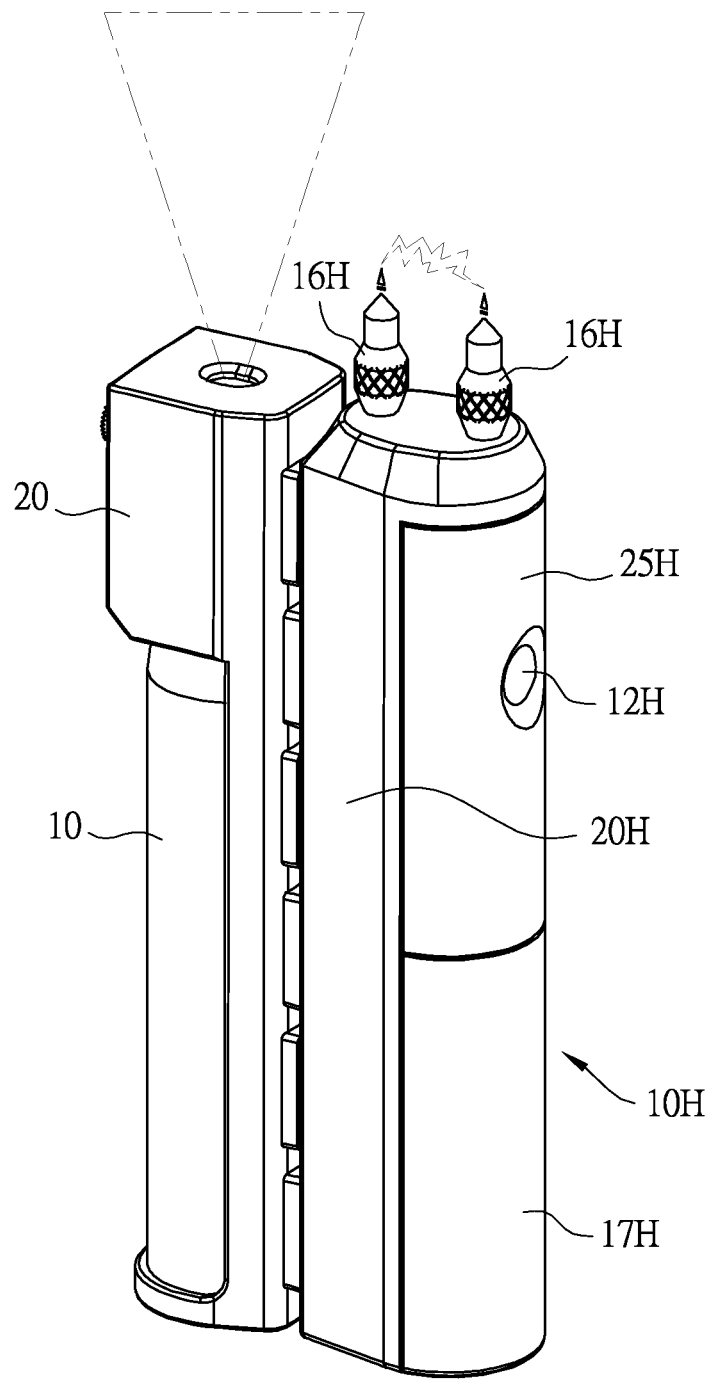
FIG. 14 is an operational view of the interchangeable self-defense device in FIG. 13.
Figure 15:
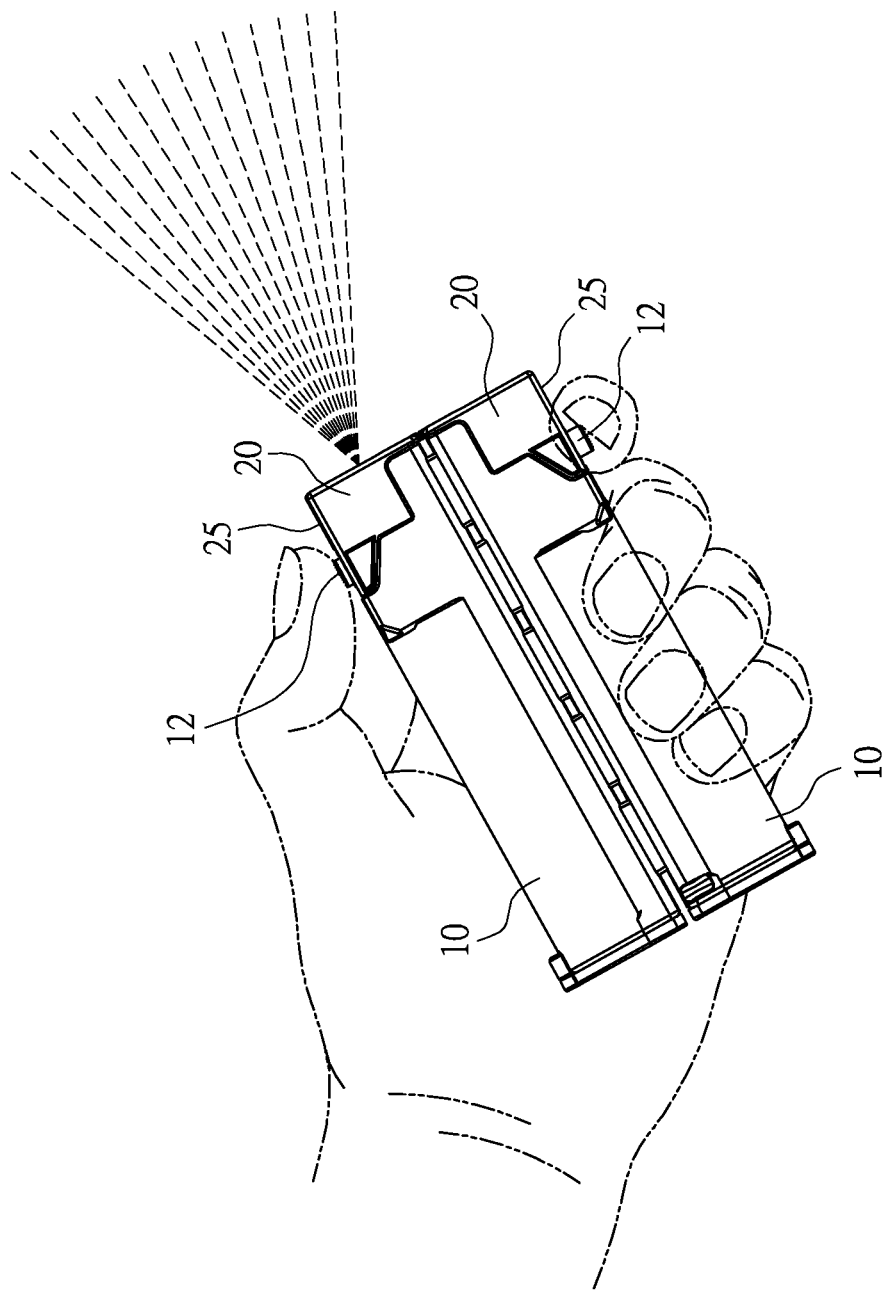
FIG. 15 is an operational view of the interchangeable self-defense device in accordance with the present invention.
Figure 16:
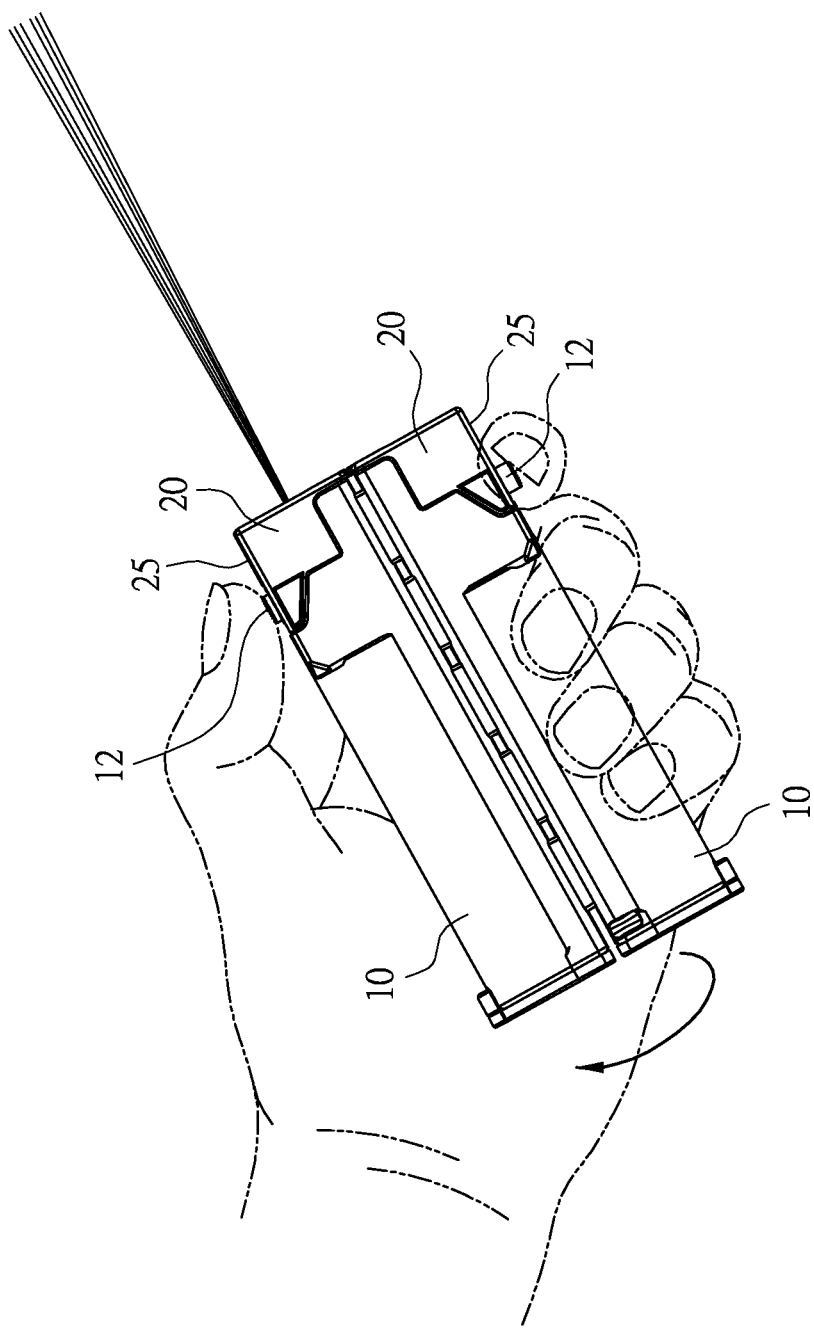
FIG. 16 is another operational view of the interchangeable self-defense device in accordance with the present invention.

With reference to FIGS. 13 and 14, the ninth embodiment of the present invention and the first embodiment are roughly the same, but in the ninth embodiment, the two self-defense devices 10H, 10 are respectively a stun gun and a spray can. Specifically, the self-defense device 10H that is the stun gun is snapped on the front surface 25H of the corresponding modular housing 20H, and the rear surface 26H of said modular housing 20H is disposed with the mounting structure 22H. A top end of the stun gun has two prongs of discharging electrodes 16H. The stun gun further comprises a push-button 12H and a battery cover 17H. By pressing the push-button 12H, the user can switch on or off the electronic components in the stun gun to operate the stun gun, and the battery cover 17H is for covering the battery inside the stun gun. When the user wants to change the battery, the user can open the battery cover 17H and replace the battery inside the stun gun with a new one.

The ninth embodiment combines the two different self-defense devices (stun gun and spray can); therefore the user can simultaneously operate these two functions at the same time for better performance.

The process of operating the present invention and the advantages thereof are as follows:

With reference to FIG. 2, each one of the modular housings 20 has a self-defense device 10 mounted on the front surface 25 of said modular housing 20, and also has a mounting structure 22 on the rear surface 26; therefore each self-defense device 10 can be integrated with each other through the mounting structures 22 on the modular housings 20. Specifically, after the user combines two suitable self-defense devices 10 by snapping onto the corresponding modular housings 20, the user can then have an integrated self-defense device with two different functions. For example, with reference to FIGS. 15 and 16, in the first embodiment, the two self-defense devices 10 that are integrated are an aerosol spray can and a flat stream spray can respectively.

With reference to FIGS. 10, 14, 15, and 16, in the embodiments in which the push-button (12, 12F, 12H) is included, specifically, the first embodiment, the seventh embodiment, and the ninth embodiment, the purpose of mounting the push-button 12, 12F, 12H on the front surface 25 of the modular housing 20 is in that when the user is holding the present invention in hand, because the two modular housings 20 are detachably interlocking with each other by the rear surfaces 26, the two push-buttons 12 will then be disposed on two opposite sides, which is convenient for the user to press the two push-buttons 12 by single hand; therefore enhancing the practicality of the present invention.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An interchangeable self-defense device comprising:
   two self-defense devices configured for launching a corresponding defensive function in an action direction; and
   two modular housings, the two self-defense devices respectively mounted in the two modular housings, each one of the two modular housings having:
      a first end;
      a second end;
      a side surface connecting the first end and the second end; and
      a mounting structure formed on a side surface of each of said modular housings;
   wherein the mounting structures of the two modular housings are configured to detachably interlock with each other and when the two modular housings interlock with each other, the first ends of the two modular housings are oriented to face toward a same direction; and wherein the self-defense devices work in the same action direction respectively from the first ends of the modular housings.

2. The interchangeable self-defense device as claimed in claim 1, wherein each one of the mounting structures has at least one mounting unit, and the at least one mounting unit has
   at least one inner protrusion; and
   an annular mounting wall disposed beside the at least one inner protrusion;
   wherein when the two modular housings detachably interlock with each other, the at least one inner protrusion of one of the two modular housings interlocks with the annular mounting wall of the other modular housing.

3. The interchangeable self-defense device as claimed in claim 2, wherein in each one of the mounting units, a number of the at least one inner protrusion is plural, and the plural inner protrusions are arranged apart from each other, and are arranged in a rectangular shape, and an engaging space is defined inside the rectangularly-arranged inner protrusions.

4. The interchangeable self-defense device as claimed in claim 3, wherein each one of the mounting units further comprises a dividing part disposed in the annular mounting wall, and the dividing part divides the annular mounting wall into two recesses;
   wherein when the two modular housings engage with each other, the inner protrusions of one of the two modular housings detachably engage with the two recesses of the other modular housing, and the dividing part interlocks with the engaging space.

5. The interchangeable self-defense device as claimed in claim 4, wherein when the two modular housings interlock with each other, each one of the inner protrusions of one of the two modular housings interlocks between the annular mounting wall and the dividing part of the other modular housing.

6. The interchangeable self-defense device as claimed in claim 1, wherein each one of the mounting structures has at least one mounting unit, and the at least one mounting unit has an inner protrusion; and multiple outer protrusions mounted beside the inner protrusion, the multiple outer protrusions annularly arranged apart from each other, and an engaging space defined inside the annularly arranged outer protrusions;

wherein when the two modular housings engage with each other, the inner protrusion of one of the two modular housings is detachably interlocked in the engaging space of the other modular housing.

7. The interchangeable self-defense device as claimed in claim 6, wherein for each one of the mounting units, the outer protrusions are arranged in a rectangular shape.

8. The interchangeable self-defense device as claimed in claim 6, wherein for each one of the mounting units, the outer protrusions are arranged in a triangular shape.

9. The interchangeable self-defense device as claimed in claim 6, wherein when the two modular housings engage with each other, the inner protrusion of one of the two modular housings interlocks with the outer protrusions of the other modular housing.

10. The interchangeable self-defense device as claimed in claim 7, wherein when the two modular housings engage with each other, the inner protrusion of one of the two modular housings interlocks the outer protrusions of the other modular housing.

11. The interchangeable self-defense device as claimed in claim 8, wherein when the two modular housings interlock with each other, the inner protrusion of one of the two modular housings interlocks the outer protrusions of the other modular housing.

12. The interchangeable self-defense device as claimed in claim 2, wherein for each one of the two modular housings, a number of the at least one mounting unit is plural, and the plural mounting units are arranged apart from each other vertically.

13. The interchangeable self-defense device as claimed in claim 6, wherein for each one of the two modular housings, a number of the at least one mounting unit is plural, and the plural mounting units are arranged apart from each other vertically.

14. The interchangeable self-defense device as claimed in claim 10, wherein for each one of the two modular housings, a number of the at least one mounting unit is plural, and the plural mounting units are arranged apart from each other vertically.

15. The interchangeable self-defense device as claimed in claim 11, wherein for each one of the two modular housings, a number of the at least one mounting unit is plural, and the plural mounting units are arranged apart from each other vertically.

16. The interchangeable self-defense device as claimed in claim 2, wherein for each one of the two modular housings, a number of the at least one mounting unit is plural, and the plural mounting units are arranged apart from each other horizontally.

17. The interchangeable self-defense device as claimed in claim 6, wherein for each one of the two modular housings, a number of the at least one mounting unit is plural, and the plural mounting units are arranged apart from each other horizontally.

18. The interchangeable self-defense device as claimed in claim 10, wherein for each one of the two modular housings, a number of the at least one mounting unit is plural, and the plural mounting units are arranged apart from each other horizontally.

19. The interchangeable self-defense device as claimed in claim 11, wherein for each one of the two modular housings, a number of the at least one mounting unit is plural, and the plural mounting units are arranged apart from each other horizontally.

* * * * *